(12) United States Patent
Kurosawa et al.

(10) Patent No.: US 7,294,982 B2
(45) Date of Patent: Nov. 13, 2007

(54) MOTOR DRIVE DEVICE AND INTEGRATED CIRCUIT DEVICE FOR MOTOR DRIVING

(75) Inventors: Minoru Kurosawa, Takasaki (JP); Yasuhiko Kokami, Takasaki (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/371,243

(22) Filed: Mar. 9, 2006

(65) Prior Publication Data

US 2006/0158142 A1   Jul. 20, 2006

Related U.S. Application Data

(63) Continuation of application No. 10/938,568, filed on Sep. 13, 2004, now Pat. No. 7,088,063.

(30) Foreign Application Priority Data

Sep. 26, 2003 (JP) .............................. 2003-335412

(51) Int. Cl.
*H02K 21/00* (2006.01)
*H02K 23/00* (2006.01)
(52) U.S. Cl. ...................... 318/254; 318/138; 318/439; 318/599; 318/432; 318/434
(58) Field of Classification Search ................ 318/138, 318/254, 439, 599, 432–434, 700
See application file for complete search history.

(56) References Cited

U.S. PATENT DOCUMENTS 5,517,095 A    5/1996  Carobolante et al.
5,726,543 A    3/1998  Park et al.
6,236,174 B1   5/2001  White
6,274,963 B1   8/2001  Estabrook et al.
6,515,443 B2*  2/2003  Kelly et al. .................. 318/599
6,900,604 B2*  5/2005  Kokami et al. ............. 318/254
6,906,485 B2*  6/2005  Hussein ...................... 318/439

FOREIGN PATENT DOCUMENTS

JP     10-341588    12/1998
JP     2000-201495   7/2000

* cited by examiner

*Primary Examiner*—Lincoln Donovan
*Assistant Examiner*—Tyrone Smith
(74) *Attorney, Agent, or Firm*—Mattingly, Stanger, Malur & Brundidge, P.C.

(57) ABSTRACT

A three-phase DC motor output stage including a predriver that supplies drive voltages to power MOSFETs supplies output voltages to three-phase coils, monitors whether each of gate-to-source voltages of the power MOSFETs is greater than or equal to a predetermined voltage and thereby detects a current zero cross, and employs the output of such current zero cross detection in PLL control for controlling energization switching timing and thereby forms drive voltages of 180-degree energization. Lower hooks with a voltage minimum phase as GND and upper hooks with a voltage maximum phase as a source are set as patterns alternately repeated for every electrical angle of 60 degrees. The patterns are expressed in linear approximation to generate sine wave-like drive voltages, thereby causing sine wave-like currents to flow into the three-phase coils.

5 Claims, 17 Drawing Sheets

$$\Delta\theta\text{coil} = \tan^{-1}\frac{\omega \cdot Lm}{Ron + Rm}$$

$$= \tan^{-1}\frac{2 \cdot \pi \cdot fBEMF \cdot Lm}{Ron + Rm}$$

THREE-PHASE SINE WAVE

GND GROUND

US 7,294,982 B2

MOTOR DRIVE DEVICE AND INTEGRATED CIRCUIT DEVICE FOR MOTOR DRIVING

This is a continuation application of U.S. Ser. No. 10/938,568, filed Sep. 13, 2004 now U.S. Pat. No. 7,088,063.

CROSS-REFERENCE TO RELATED APPLICATION

The present application claims priority from Japanese patent application No. 2003-335412 filed on Sep. 26, 2003, the content of which is hereby incorporated by reference into this application.

BACKGROUND OF THE INVENTION

The present invention relates to a motor drive device and an integrated circuit device for motor driving, and to a technique effective if applied to a rotation control technique for a three-phase spindle motor of HDD (Hard Disk Driver) or the like.

As a system for driving a spindle motor of an HDD system, a soft switch system has been adopted which performs PWM corresponding to two phases upon energized-phase switching to thereby suppress a steep change in current. Although it is necessary to detect the position of a motor for the purpose of rotating the motor, it is known as a sensorless system that a de-energization period is provided after the energized-phase switching to detect a back electromotive force (BEMF) of the motor. Japanese Unexamined Patent Publication No. Hei 10(1998)-341588 (patent document 1) is known as one for detecting a current zero cross of each inductive load.

SUMMARY OF THE INVENTION

The publication art aims to drive motor coils (inductive loads) in a voltage mode through a half bridge comprising a high-order side switch and a low-order side switch driven in antiphase relative to each other by PWM signals and determine an output voltage of the half bridge lying during a period in which the switches are both in an off state, through a comparator to discriminate or judge a current direction. Thus, the publication art is accompanied by the problem that the dead time required to bring both the switches to the off state must be provided long to some degree to obtain the output voltage for determining the current direction. The publication art also involves a problem that, for instance, since the switches have time delays from the time when drive signals change so as to provide instructions for the off state to the time when they are actually turned off, there is a need to perform determination timing control of the comparator, which takes into consideration these time delays, or the period in which a motor current flows through a parasitic diode of each switch kept in the off state, becomes long due to the increase in the dead time so that reactive power generated in the parasitic diode having a parasitic resistance value larger than an on resistance value of each switch increases, or a high operating voltage greater than the operating voltage of the half bridge becomes necessary for the comparator.

A block diagram of a motor drive device using the sensorless technique for providing the de-energization period after the energized-phase switching to detect the position of the motor discussed by the present inventors prior to the present invention and detecting the back electromotive force (BEMF) of the motor is shown in FIG. 17.

The motor drive device comprises an output stage which comprises power elements such as power MOSFETs M1 through M6, and a predriver and drives a three-phase DC motor, a dc current detection section comprising a dc shunt resistor Rnf, a sampling/hold circuit S/H1 and a sense amplifier SA, a back electromotive force (BEMF) detection section comprising selectors SELs 1 and 2, a preamplifier PA, a filter PFL and a zero cross comparator CMP3, and a logic section comprising an analog-to-digital converter ADC which converts a dc current or a voltage that appears in a de-energized phase of three phases to a digital value, a PLL (Phase Locked Loop) control loop, a current control loop, a soft switch controller which suppresses a steep change in current at the energized-phase switching, a serial port which receives an instruction from a microprocessor (microcomputer) MPU, a register, etc.

As shown in an operation waveform diagram of FIG. 18, the position detection of the motor is performed by selecting a de-energized phase and detecting a zero cross of a back electromotive force. The energization switching of the motor is performed by PLL control through the use of the result of detection. Current control is performed in such a manner that a motor drive current detected by the dc shunt resistor Rnf coincides with a current instruction signal (SPN CRNT DAT) from the MPU. The output stage PWM-controls the motor with a suitable duty. Upon switching of the energized phase, two phases are PWM-operated by soft switch (SOFTSW) control to smooth current switching. A driven waveform is in a de-energized state only upon the zero cross detection of the back electromotive force and takes a repetition of a voltage profile under the soft switch control (SP1) after a zero cross detection period, PWM under the current control after the voltage profile, a voltage profile under the soft switch control (SP2) and a de-energization period for the zero cross detection.

A mask (MASK) signal is brought to a BEMF detection period at a low level of a signal for controlling the zero cross detection period of the back electromotive force BEMF. A PHASE signal is a signal synchronized with the BEMF of the motor and is a signal which notifies the rotational speed of the motor to the MPU. In the motor drive device, the drive current waveform results in a smooth waveform by virtue of the effect of the soft switch control. However, torque ripples each associated with the de-energization period exist in generated torque. There is a need to provide each de-energization period to perform the zero cross detection of the BEMF. With its provision, the torque ripples cannot be suppressed. When the torque ripples remain, it is difficult to bring the motor into low vibrations and high-accuracy rotation. Higher densification of recording becomes difficult and the noise of the motor cannot be reduced.

An object of the present invention is to provide a motor drive device and an integrated circuit device for motor driving, both of which provides high performance and high functions with a simple configuration. Another object of the present invention is to provide a motor drive device and an integrated circuit device for motor driving, both of which significantly reduce torque ripples. The above, other objects and novel features of the present invention will become apparent from the specification of the present specification and the accompanying drawings.

A summary of a representative one of the inventions disclosed in the present application will be explained in brief as follows: A three-phase DC motor output stage including a predriver that supplies drive voltages to power MOSFETs supplies output voltages to three-phase coils, monitors whether each of gate-to-source voltages of the power MOS- FETs is greater than or equal to a predetermined voltage and thereby detects a current zero cross, and employs the output of such current zero cross detection in PLL control for controlling energization switching timing and thereby forms drive voltages of 180° (deg) energization.

A summary of another typical one of the inventions disclosed in the present application will be explained in brief as follows: A three-phase DC motor output stage including a predriver which supplies drive voltages to power MOS-FETs, supplies output voltages to three-phase coils, sets lower hooks with a voltage minimum phase as GND and upper hooks with a voltage maximum phase as a source as patterns alternately repeated for every electrical angle of 60 degrees, and expresses the patterns in linear approximation to generate sine wave-like drive voltages, thereby causing sine wave-like currents to flow into the three-phase coils.

During an output voltage transition period in which a PWM operation is being done, the presence or absence of a gate-to-source voltage of each output power MOSFET is determined to detect a zero cross of a current waveform, whereby torque ripples can be reduced with it as 180-degree energization free of a motor's de-energization period.

Alternatively, each of drive voltages is represented as patterns repeated at every electrical angle of 60 degrees, and the patterns are expressed in linear approximation, thereby making it possible to obtain a sine wave-like drive voltage high in accuracy with a simple configuration, whereby motor driving can be realized at constant torque.

DETAILED DESCRIPTION OF THE PREFERRED EMBODIMENTS

Preferred embodiments of the present invention will hereinafter be described in detail with reference to the accompanying drawings.

Figure 1:
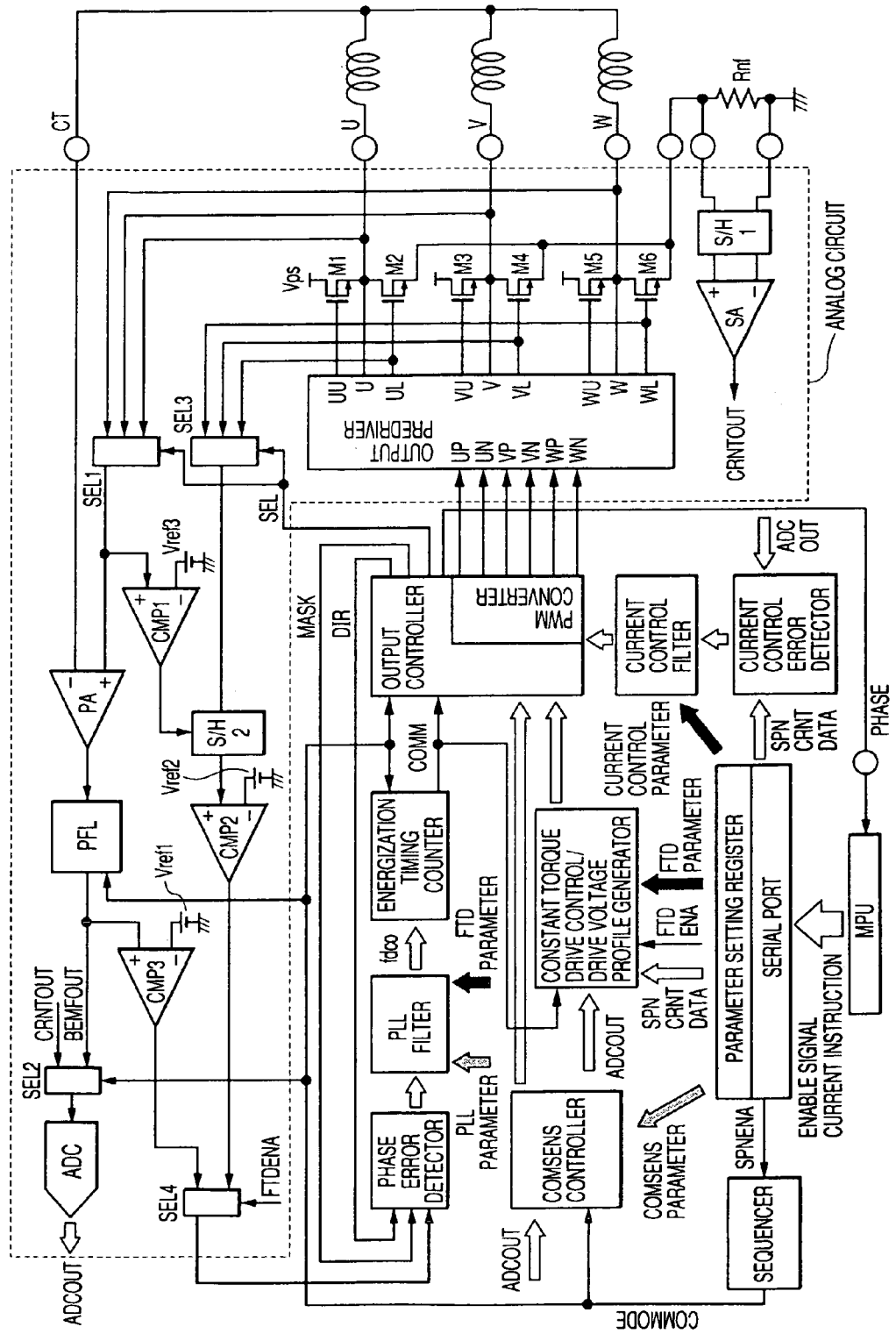
FIG. 1 is a block diagram showing one embodiment of a motor drive device according to the present invention.

A block diagram showing one embodiment of a motor drive device according to the present invention is shown in FIG. 1. The present embodiment is intended for constant torque driving of a three-phase motor used as a multiphase motor based on 180-degree energization. Three-phase motor coils are driven based on pulse width modulation (PWM) signals by an output stage comprising power elements such as power MOSFETs M1 through M6, and an output predriver. The predriver is operated with, as inputs, signals UP, UN, VP, VN, WP and WN obtained by PWM-modulating sine wave-like drive voltages generated from a drive voltage profile generator by an output controller.

A selector SEL1 selects a BEMF (Back ElectroMotive Force) detected phase from spindle output voltages U, V and W, and a preamplifier PA generates a voltage corresponding to the difference between the selected detected phase and the voltage at a neutral or center point CT among the motor coils. An output signal of the preamplifier PA is subjected to filtering by a prefilter PFL, followed by being compared with a reference voltage Vref1 by a comparator CMP3. The comparator CMP3 detects a zero cross of the BEMF (Back ElectroMotive Force).

The three-phase coils are driven by the output stage comprising half bridges configured of the power MOSFETs on the high-order side and the power MOSFETs on the low-order side respectively driven by the PWM signals in antiphase relative to one another. A selector SEL3 selects a phase for performing current zero cross detection from each of gate voltages UL, VL and WL of the MOSFETs M2, M4 and M6 on the lower side, of the output stage comprising the half bridges. A comparator CMP2 detects timing in which the output of the selector SEL1 intersects a reference voltage Vref3. In other words, a sampling/hold circuit S/H samples/holds the output of the selector SEL3 during a period in which the spindle output voltages U, V and W are in transition. Then, the comparator CMP2 compares the sampled/hold voltage and a reference voltage Vref2 to detect a current zero cross.

A selector SEL4 selects whether any of information about the zero cross output of the BEMF and the current zero cross output should be used. The result of the current zero cross detection is used in the case of constant torque driving, whereas the zero cross result of the BEMF is utilized other than the above case. This aims at utilizing stable activation or start-up based on the BEMF detection when the rotation of the motor is at instable low rotation.

Figure 18:
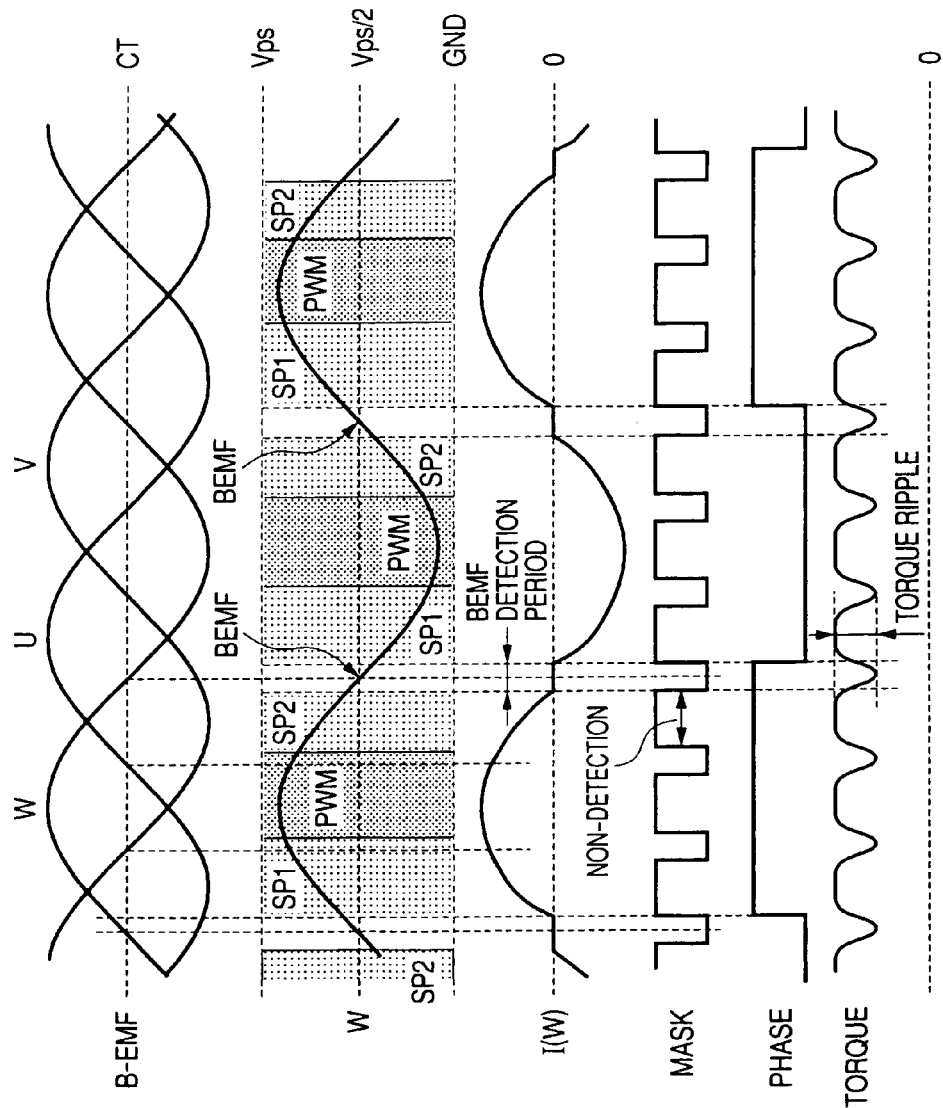
FIG. 18 is a waveform diagram showing the operation of FIG. 17.

The zero cross detection result is inputted to a phase error detector. A phase error detected signal outputted from the phase error detector is used to realize motor driving at a low rotational jitter by a PLL control loop comprising a phase locked loop (PLL) filter, an energization timing counter, the output controller, the output stage and the motor. The present embodiment is adapted to selective use of the two zero cross detection results as described above. The PLL control loop is provided with the function of adjusting loop gain for allowing the use of the current zero cross to act in a manner similar to the use of the zero cross output of BEMF. Since the deenergization period like the time when the BEMF shown in FIG. 18 is detected, is unnecessary when the current zero cross is used in phase error detection, 180-degree energization can be realized, and motor driving at substantially constant torque less reduced in torque ripple can be realized by the sine wave-shaped drive voltages.

A motor drive current is detected using a dc shunt resistor Rnf. A voltage detected by the dc shunt resistor Rnf is amplified by a sense amplifier SA through a sampling/hold circuit S/H1, after which the result thereof is inputted to an analog/digital (A/D) converter ADC. A current control error detector calculates an error of an A/D-converted detection value CRNTOUT from current instructions SPN CRNT DATA, and the drive current is controlled by a current control loop comprising a current control filter, the output controller, the output stage and the motor. As to speed control of the motor, the output controller outputs a PHASE signal corresponding to a periodic signal proportional to the number of revolutions of the motor, and a microprocessor MPU performs a comparison thereof with a target speed and inputs current instructions corresponding to the speed.

Interfacing to the microprocessor MPU is performed at a serial port, and various parameters such as current instructions (SPN, CRNT DATA), current control, PLL, constant torque, etc. are set by a register. A spindle unit system has even a COMSENS controller for controlling startup from a motor de-energized state, and a sequencer for controlling internal operations. According to the above blocks, the spindle motor is driven under constant torque based on 180-degree energization.

Figure 2:
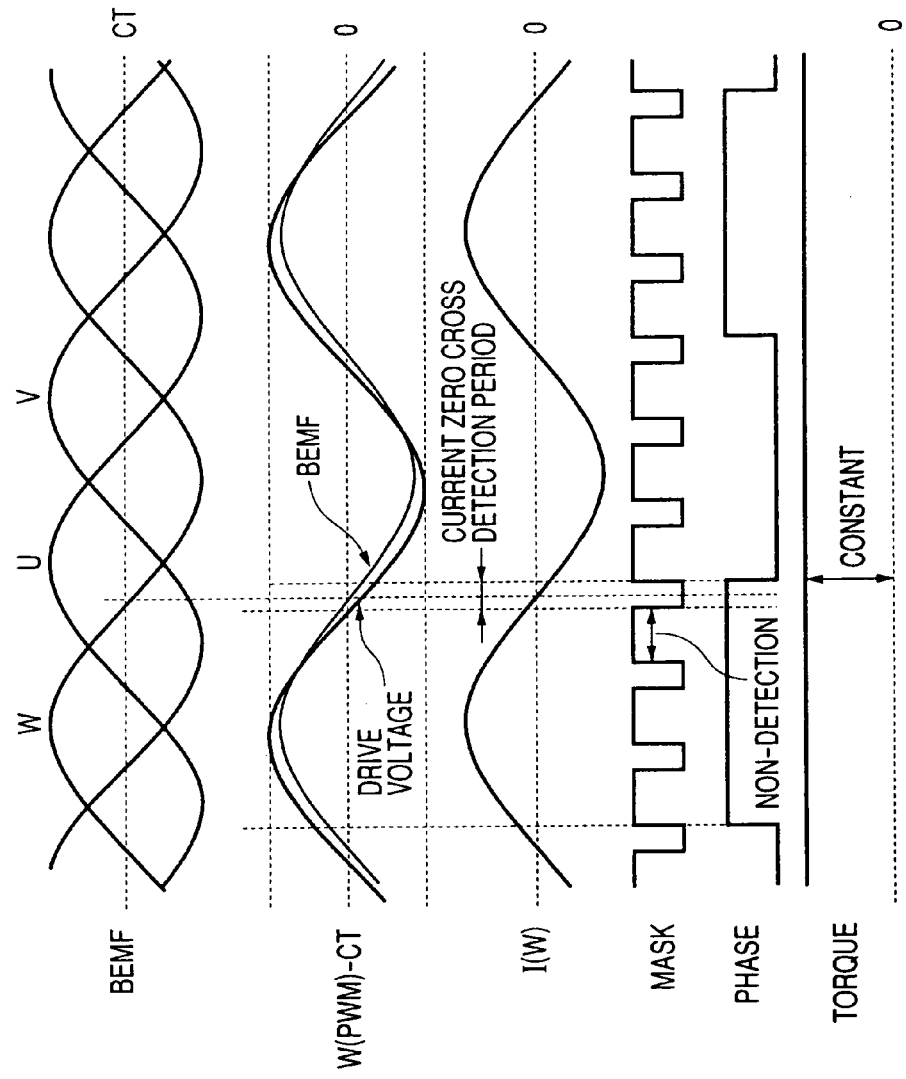
FIG. 2 is a waveform diagram for describing one example of the operation of the motor drive device shown in FIG. 1.

A waveform diagram for describing one example of the operation of the motor drive device shown in FIG. 1 is shown in FIG. 2. Operation waveforms placed under the constant torque driving based on 180-degree energization are shown in the same drawing. When energization timing is controlled with execution of the current zero cross detection, such a de-energization period for BEMF detection as shown in FIG. 18 becomes unnecessary, and hence the motor can be driven by sine wave-like voltages as shown in FIG. 2. Incidentally, although PWM operating waveforms are taken in practice, the operating waveforms are shown for convenience to facilitate the understanding of the invention in the same drawing. The voltage applied to each of the motor coils is equivalent to a voltage obtained by subtracting a BEMF (Back Electromotive Force) from a drive voltage. When the BEMF is of a sine wave, the voltage applied to each of the motor coils also assumes the sine wave. Thus, a drive current also results in a sine wave. Thus, it is possible to drive the motor at constant torque. Accordingly, the torque becomes constant, and the motor can be brought to low noise and low vibrations.

Figure 3:
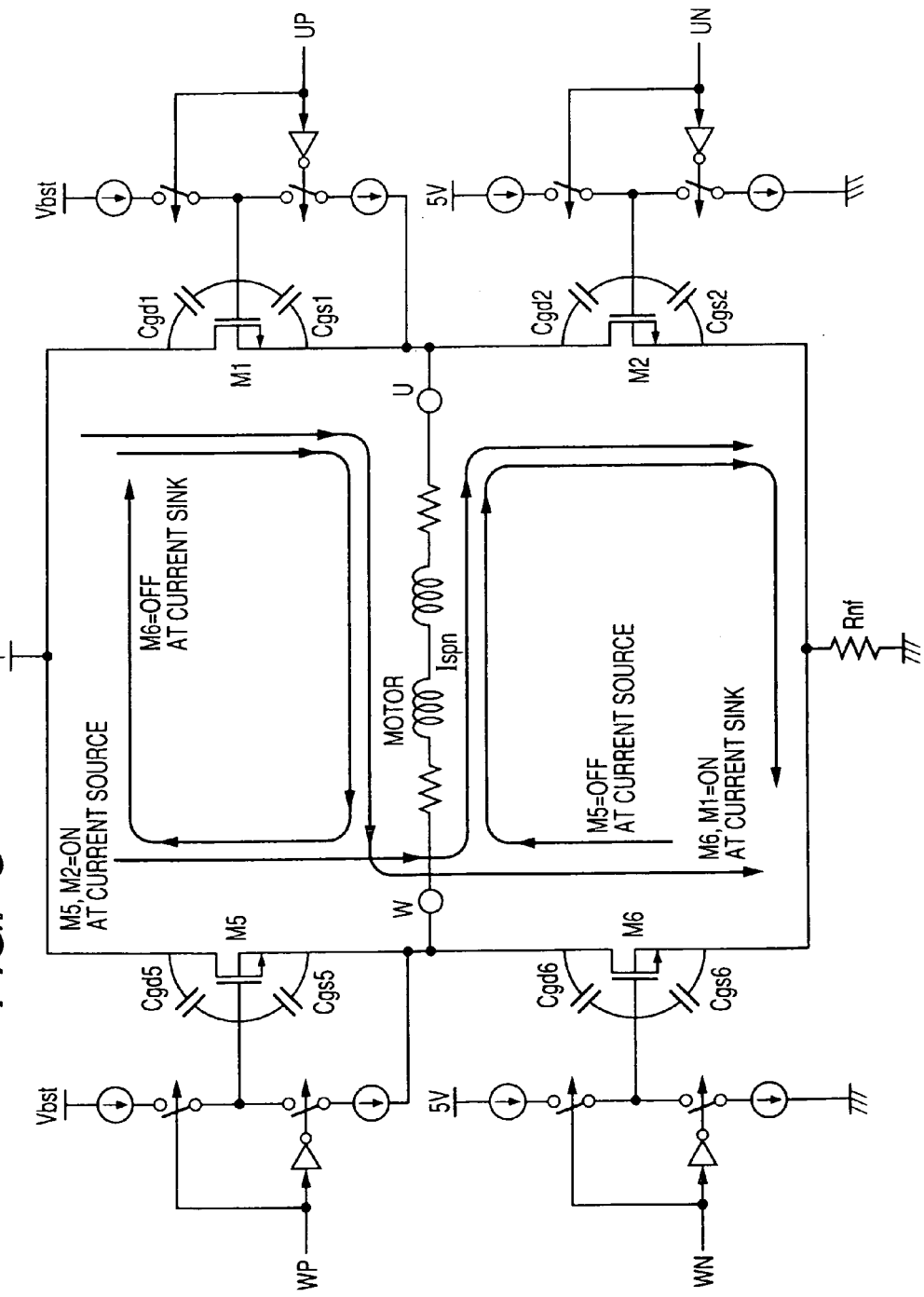
FIG. 3 is a circuit diagram illustrating one operation example of an output stage of the motor drive device according to the present invention.

A circuit diagram of one embodiment of the output stage of the motor drive device according to the present invention is shown in FIG. 3. A half bridge circuit corresponding to two phases and drive current paths in power MOSFET operating states are also typically shown in the same drawing by arrows together. Considering a configuration of the output stage with two phases of U and W, such a circuit configuration of half bridge (H bridge) type as shown in the same drawing is taken. Power MOSFETs M1, M2, M5 and M6 are respectively on/off-controlled according to whether gate capacitances Cgd and Cgs are charged or discharged by control signals UP, UN, WP and WN. Since the power MOSFETs are all N channel MOSFETs, they are turned on when their gate-to-source voltages are respectively positive greater than or equal to a threshold voltage, whereas they are turned off when the gate-to-source voltages are zero. Thus, it is necessary to operate a control circuit for the upper power MOSFETs M1 and M5 at a power supply Vbst obtained by boosting or stepping up a power supply Vps.

Now consider that, for example, a motor's drive current is placed in a state of flowing from the power supply Vps to the power MOSFET M2 through the power MOSFET M5 and the motor, i.e., the W phase is in a state of a current source and the U phase is in a state of current sinking. When the power MOSFETs M5 and M2 are held on by the PWM operation, the drive current flows through the power supply, M5, motor, M2 and Rnf (power supply→M5 motor→M2→Rnf). At this time, the output voltage for the W phase results in Vps−Ron×Ispn. Here, Ron indicates on resistances of the MOSFETs M1, M2, M5 and M6.

On the other hand, when the power MOSFET M5 is turned off by the PWM operation, the current flowing through the motor is maintained by time constant of each coil thereof and hence the drive current regeneratively flows through M6, motor, M2 and M6 (M6→motor→M2→M6). At this time, the output voltage for the W phase results in −Ron×Ispn. Now consider a state in which the output voltage transitions. Sine the power MOSFET M5 is operated in a saturated state when the drive current is of source, the output voltage transitions. Thus, the gate-to-source voltages Vgs of the power MOSFETs placed during an output transition period result in Vgs>Vth on the upper side and Vgs=0V on the lower side in the case of the current source.

Next consider where the motor's drive current is placed in a state of flowing from the power supply Vps to the power MOSFET M6 through the power MOSFET M1 and the motor, i.e., the W phase is in a state of current sinking and the U phase is in a state of the current source. When the power MOSFETs M1 and M6 are held on by the PWM operation, the drive current flows through the power supply, M1, motor, M6 and Rnf (power supply→M1→motor→M6→Rnf). At this time, the output voltage for the W phase results in Ron×Ispn.

On the other hand, when the power MOSFET M6 is turned off by the PWM operation, the current flowing through the motor is maintained by time constant of each coil thereof and hence the drive current regeneratively flows through M1, motor, M5 and M1 (M1→motor→M5→M1). At this time, the output voltage for the W phase results in Vps+Ron×Ispn. Now consider a state in which the output voltage transitions. Sine the power MOSFET M6 is operated in a saturated state when the drive current is sinking, the output voltage transitions. Thus, the gate-to-source voltages Vgs of the power MOSFETs placed during the output transition period result in Vgs=0V on the upper side and Vgs>Vth on the lower side in the case of the current sink. Since Vgs placed during the output transition period are different depending on whether the current is source or sinking with respect to one phase, current zero cross detection is enabled from the above operations.

Figure 4:
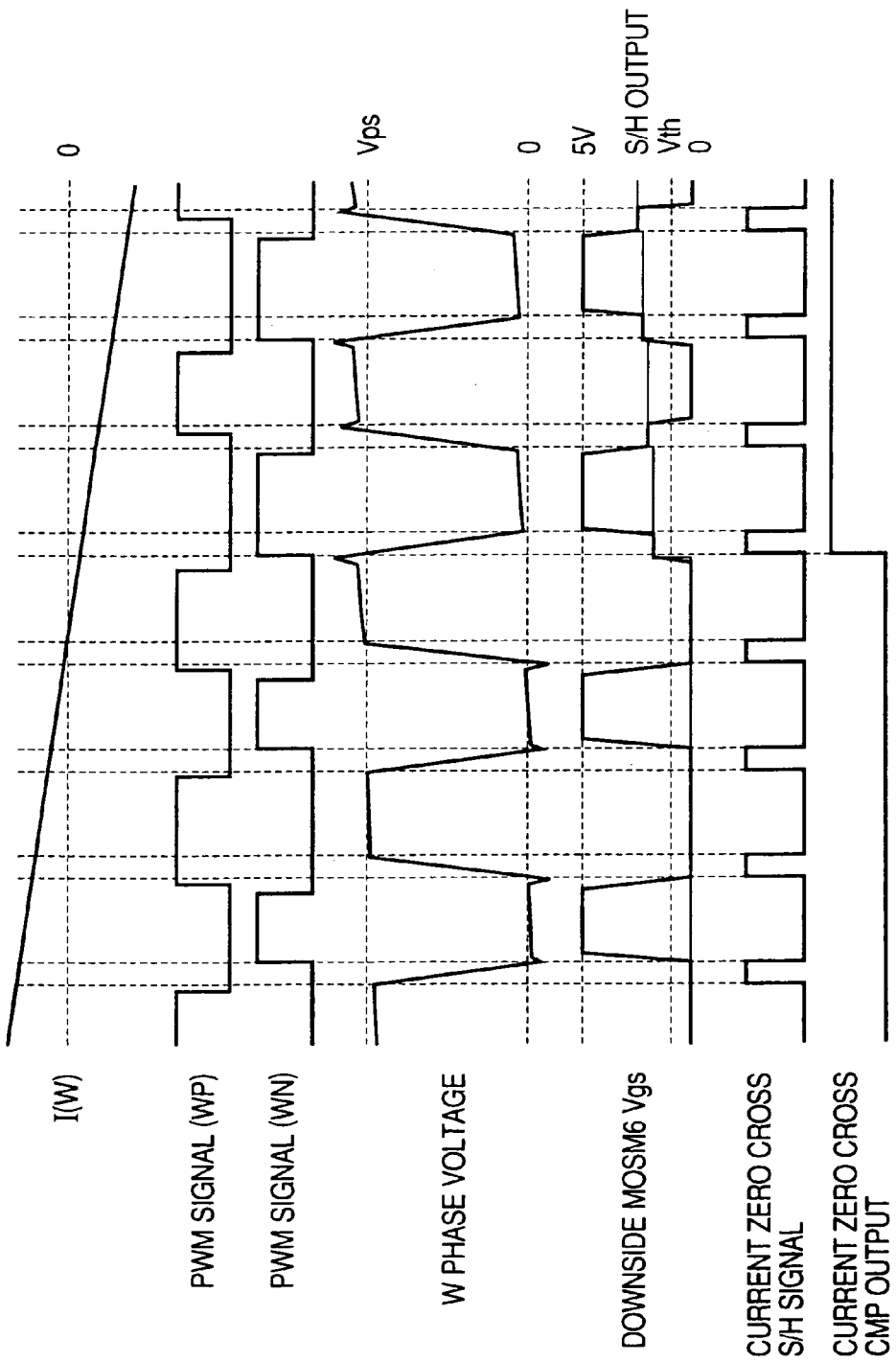
FIG. 4 is an operation waveform diagram for describing current zero cross detection at 180-degree energization, according to the present invention.

An operation waveform diagram for describing current zero cross detection based on 180-degree energization, according to the present invention is shown in FIG. 4. A state in which a drive current I(W) of a W phase is changed from a source to a sink, is illustratively shown as typical in the same drawing. In PWM signals WP and WN, the duty in which the upper power MOSFET (M5) is on, is gradually reduced. Thus, the drive current is changed from the source to the sink. When the upper power MOSFET (M5) is turned off where the drive current I(W) is of the source, the output voltage is brought to a negative potential and thereby regenerated through the lower side (M6). When the lower power MOSFET (M6) is turned off where the drive current. I(W) is sinking, the output voltage becomes higher than the power supply and thereby regenerated through the upper side. Paying attention to a transition period of the output voltage, the gate-to-source voltage Vgs of the lower power MOSFET (M6) in the case of the current source is 0V, whereas the gate-to-source voltage Vgs of the lower power MOSFET (M6) in the case of the current sink becomes higher than the threshold voltage Vth.

In the spindle unit system according to the embodiment shown in FIG. 1, the output of the comparator CMP1 for monitoring the transition of the output voltage selected by the selector SEL1 is used for the signal of the sampling/hold circuit S/H2 operated for the current zero cross detection. Thus, as shown in FIG. 4, the output of the current zero cross comparator CMP2 is switched with the first output transition timing after the drive current (W) has been changed from the source to the sink, whereby a current zero cross can be detected.

Figure 5:
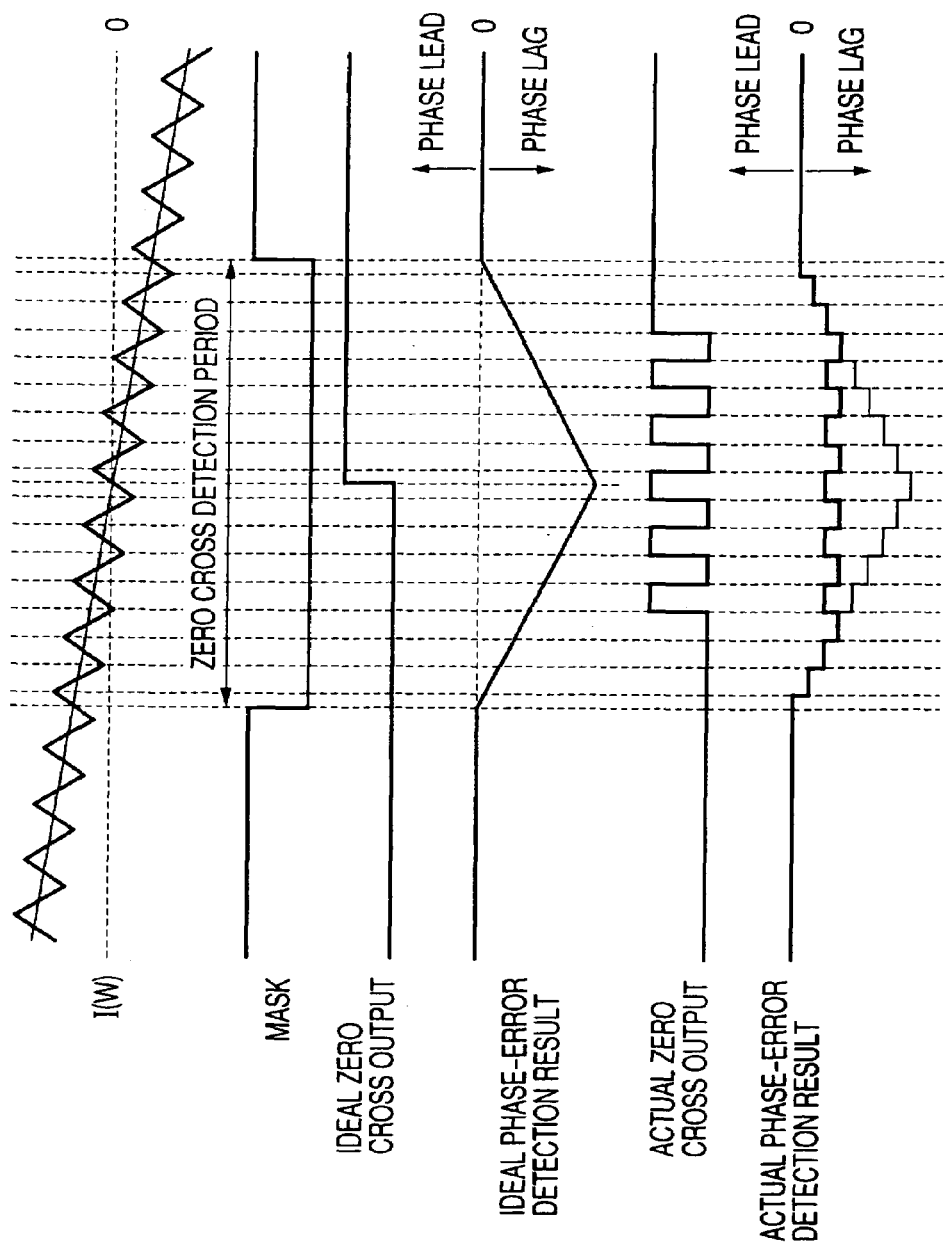
FIG. 5 is a waveform diagram for describing current zero cross detection and phase error detection at 180-degree energization, according to the present invention.

A waveform diagram for describing current zero cross detection and phase error detection at 180-degree energization, according to the present invention is shown in FIG. 5. A state in which the drive current of the W phase is changed from the source to the sink, is illustratively shown as typical in a manner similar to FIG. 4. Since the motor is being PWM-driven, such ripples as shown in FIG. 5 exist in the drive current. A MASK signal is placed in a detected state at a low level of a signal for performing control of the zero cross detection. When the signal is of a high level, the MASK signal is brought to a non-detected state. PLL controls energization switching timing in such a manner that a zero cross reaches the center of its detection period. A phase error is made minus until the zero cross arrives upon the phase error detection, and the phase error is made plus after the zero cross, whereby a phase shift relative to the center of the detection period of the zero cross is detected with a final value subsequent to completion of the zero cross detection period as the phase error.

When the phase detection error is plus, the phase leads, whereas when the phase detection error is minus, the phase lags. The energization timing is operated so as to be delayed where the phase error is plus and to be advanced where the phase error is minus. If the ripples of the drive current I(W) are not taken into consideration, then a zero cross output reaches the center of the detection period when PLL is being locked, and the phase error detection result is also bilaterally symmetrical and hence the final phase error reaches "0". Since, however, a detection offset and a current ripple exist upon an actual operation, such phase error detection cannot be performed. Therefore, the present embodiment makes use of zero cross detection made according to the presence or absence of the gate-to-source voltage Vgs of the MOSFET M6 as a method of detecting a zero cross.

When the zero cross is detected from an amount proportional to the drive current I(W), sensitivity relative to the detection offset is so high. On the other hand, since this method may not consider an influence on the detection offset, 180-degree energization can be made even to a motor operated at a lower current. Incidentally, when the zero cross has been detected from the amount proportional to the drive current I(W), the accuracy of phase error detection at the time that the detection offset could be set to within ±1 mV, results in, for example, ±2.3 degrees at drive current I(W)=0.25 A and Ron=0.1Ω.

On the other hand, since the drive current I(W) contains ripples when an actual zero cross is taken into consideration, a repetitive state of "a high level" and "a low level" exists for each PWM as a zero cross detection result. Since the edge of the zero cross output is synchronized with PWM where such a result is used in the phase error detection as it is, phase errors vary according to PWM's duty and hence accurate phase error detection becomes difficult. Therefore, the present embodiment takes phase error detection for causing up and down according to the presence or absence of the gate-to-source voltage Vgs determined for each output transition period. Although the resolution of the phase error becomes rough if done in this way, the phase error can be detected in such a manner that the average of the drive current reaches the center of the detection period as shown in FIG. 5 even if the ripples exist in the drive current. Incidentally, assuming that, for example, the detection period is an electrical angle of 15 degrees and the number of times in which the output transition is performed, is 16 (8PWM), the resolution of the phase error can be made small like 0.9375 degrees as compared with the detection accuracy at the time that the zero cross is detected from the amount proportional to the drive current.

Figure 6:
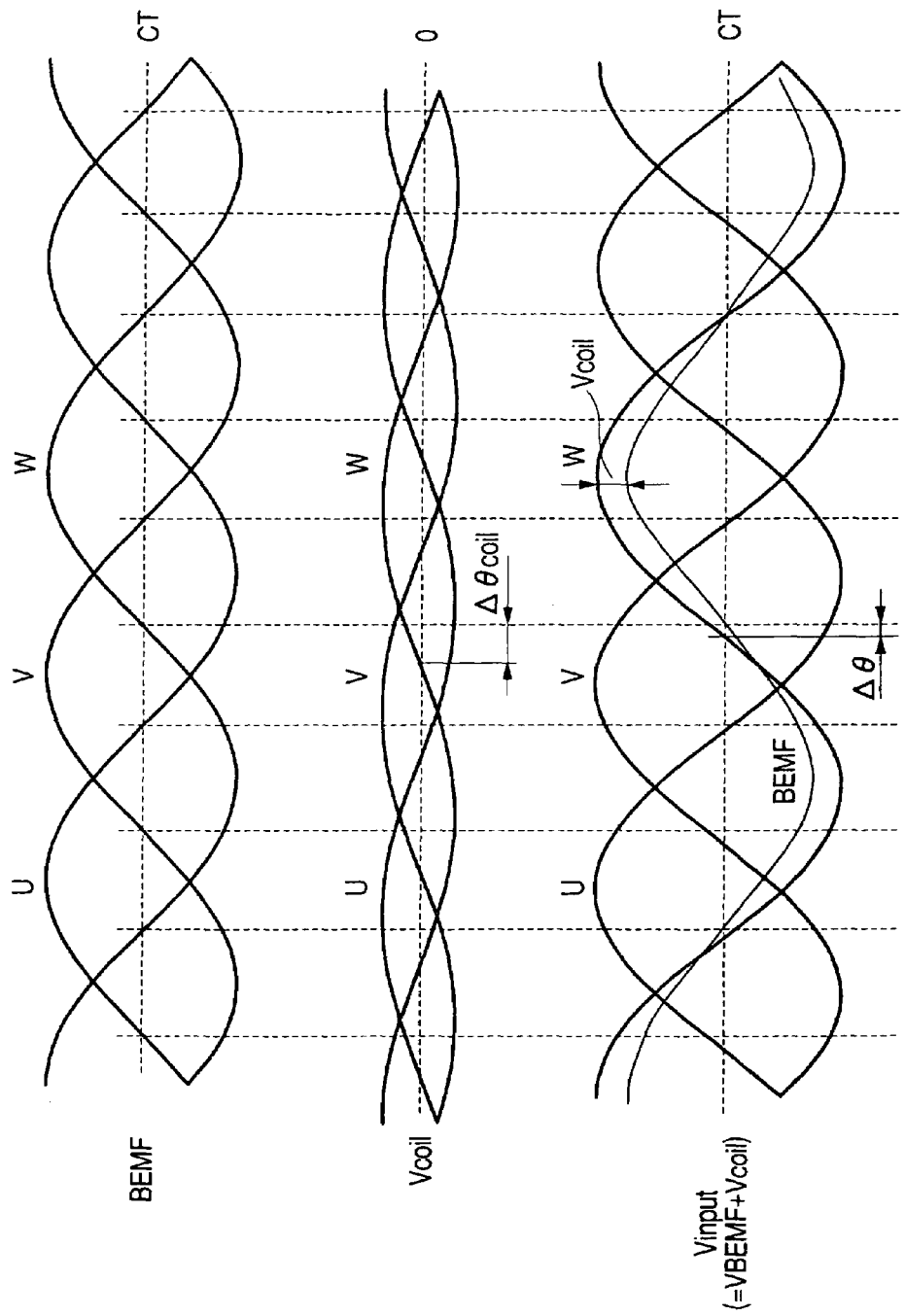
FIG. 6 is an operation waveform diagram for describing the relationship among BEMF employed in the motor drive device according to the present invention, voltages Vcoil applied to motor coils and motor drive voltages Vinput applied thereto.
Figure 7:
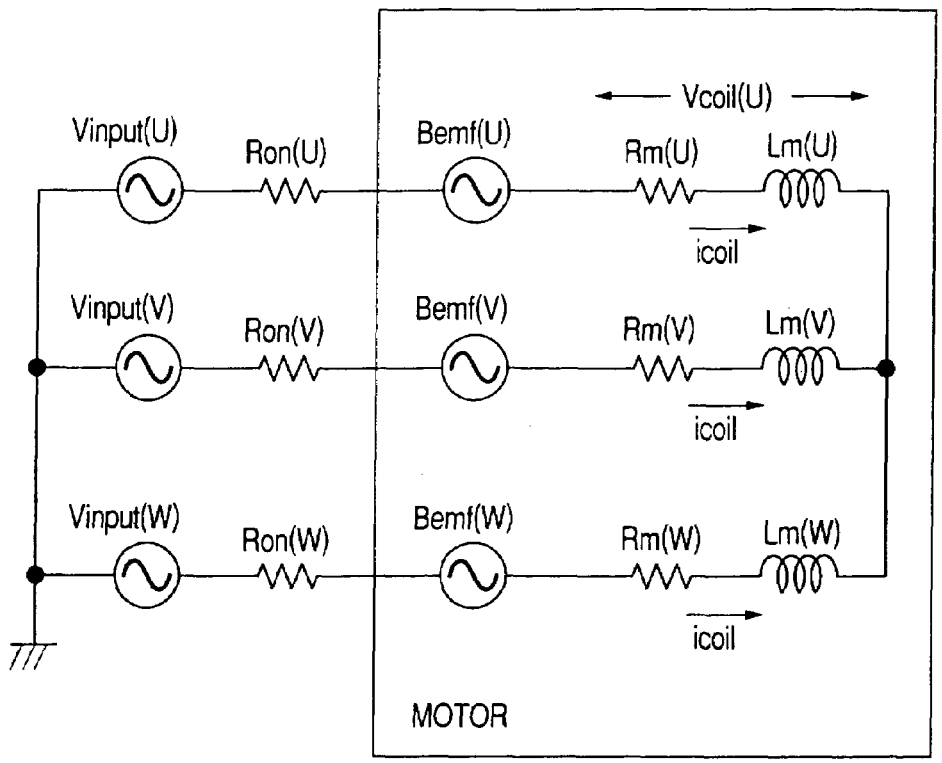
FIG. 7 is an equivalent circuit diagram showing the relationship between the drive voltages and a motor shown in FIG. 6.
Figure 8:
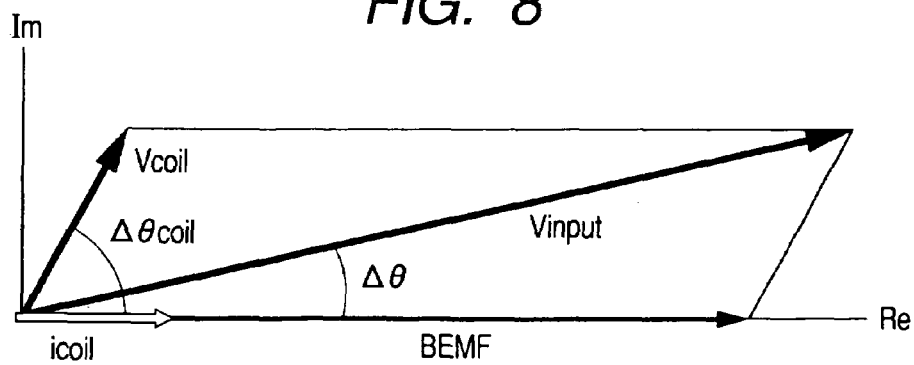
FIG. 8 is a vector diagram corresponding to FIG. 6.

Operation waveforms for describing the relationship among BEMF employed in the motor drive device according to the present invention, voltages Vcoil applied to the motor coils and motor drive voltages Vinput applied thereto are shown in FIG. 6. Its equivalent circuit is shown in FIG. 7. A vector diagram thereof is illustrated in FIG. 8. Each of the motor drive voltages Vinput corresponds to the sum of BEMF and the voltage Vcoil of the motor coil. Assuming that the drive current is caused to flow in phase with BEMF, it is necessary to cause the voltage Vcoil applied to each motor coil to lead by a phase delay Δθcoil due to coil impedance. Thus, the motor drive voltage Vinput corresponds to the vector sum of Vcoil and BEMF. It is necessary to suitably change the phase of each drive voltage according to the drive current.

Now considering a drive current phase θi and a phase θbemf of BEMF, the following (equation 1) is established. Differentiating the above (equation 1) with θi yields the following (equation 2). Thus, there is a need to adjust the gain by Kvi where PLL control is performed by current zero cross detection, in order to obtain a loop characteristic equivalent to the case in which PLL control is performed at a zero cross of BEMF. Therefore, the constant torque drive system according to the present invention has a gain control function and is capable of setting the amount of gain to be adjusted, through the use of a register. Incidentally, values calculated by internal computation from the drive current and drive voltages may be used upon the present gain control.

$$\theta_{bemf} = \tan^{-1} \frac{i_{coil} \cdot Z_m \cdot \cos(\theta_i + \theta_{coil})}{V_{input} - i_{coil} \cdot Z_m \cdot \cos(\theta_i + \theta_{coil})} \quad \text{(Equation 1)}$$

$$Kvi = \frac{\Delta \theta_{bemf}}{\Delta \theta_i} = \quad \text{(Equation 2)}$$

$$\tan^{-1} \frac{i_{coil}^2 \cdot Z_m^2 - i_{coil} \cdot Z_m \cdot V_{input} \cdot \cos(\theta_i + \theta_{coil})}{V_{input}^2 - 2 \cdot i_{coil} \cdot Z_m \cdot V_{input} \cdot \cos(\theta_i + \theta_{coil}) + i_{coil}^2 \cdot Z_m^2}$$

Figure 9A:
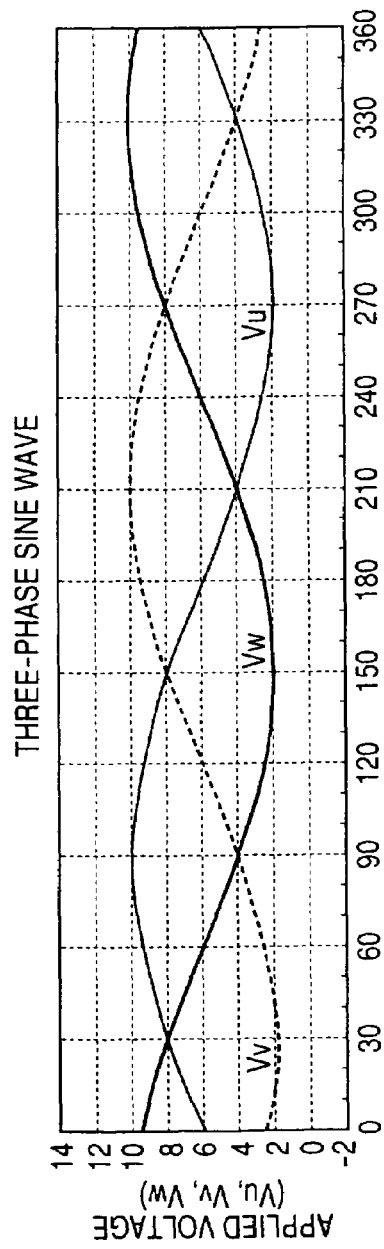
FIGS. 9(a) and 9(b) are partial applied-voltage waveform diagrams for allowing sine wave currents to flow through the motor drive device according to the present invention.
Figure 9B:
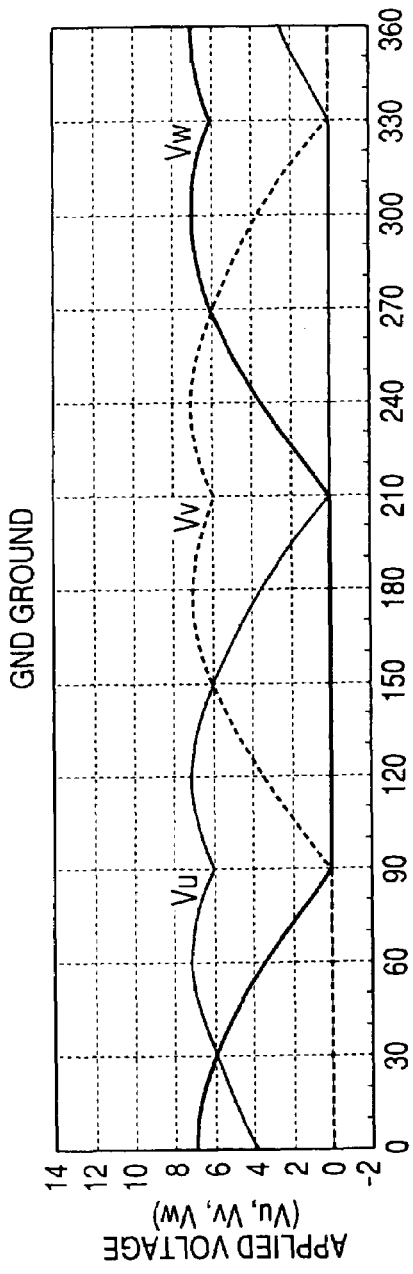
Figure 10C:
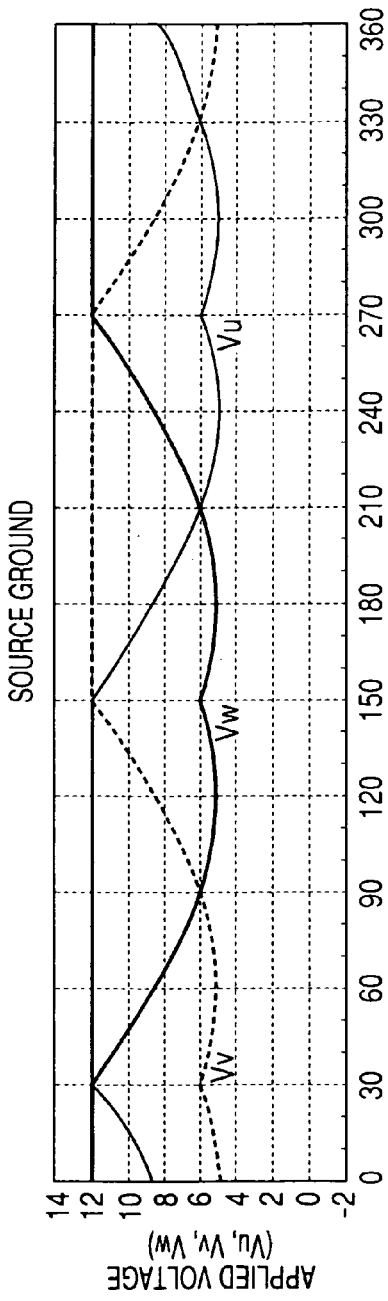
FIGS. 10(c) and 10(d) are remaining partial applied-voltage waveform diagrams for allowing sine wave currents to flow through the motor drive device according to the present invention.
Figure 10D:
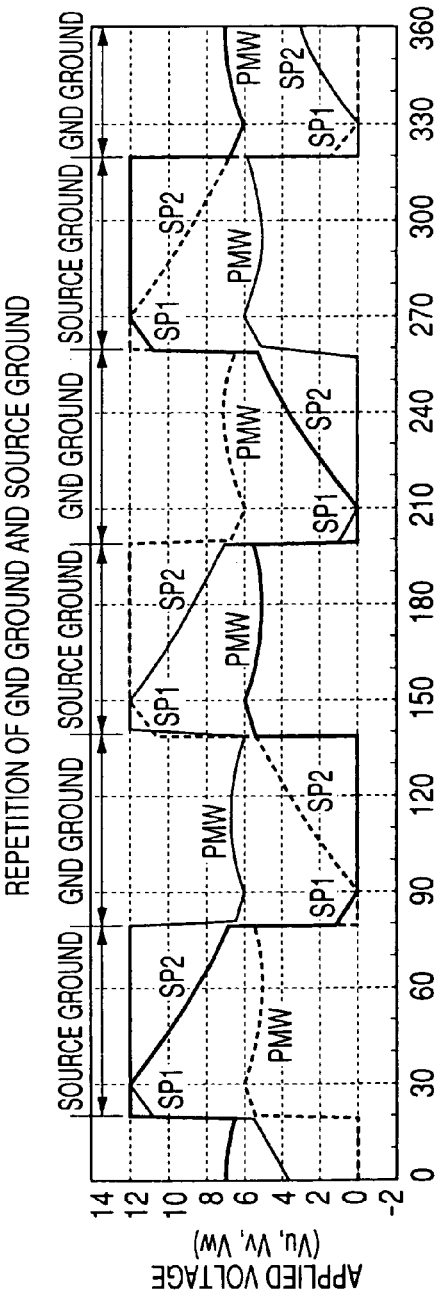

Applied-voltage waveform diagrams for causing sine wave currents to flow through the motor drive device according to the present invention are shown in FIGS. 9 and 10. Three-phase drive voltages at the time that a voltage minimum phase is "0" with respect to the three-phase drive voltages shown in FIG. 9(a)(GND ground), are represented as shown in FIG. 9(b). On the other hand, three-phase drive voltages at the time that a voltage maximum phase is set as "source" with respect to the three-phase drive voltages (source ground), are represented as shown in FIG. 10(c). Assuming now that drive voltages using the GND ground and the source ground alternately for every electrical angle of 60 degrees as shown in FIG. 10(d) are taken, the ground point assumes alternate repetition of GND and source for every electrical angle of 60 degrees but a voltage waveform results in a repetitive waveform at an electrical angle of 60 degrees.

Thus, the use of such a method makes it possible to realize obtaining of the three-phase sine wave voltages if the drive voltages each corresponding to the electrical angle of 60 degrees can be produced. By alternately using the GND ground and the source ground at every electrical angle of 60 degrees, vertical symmetry of a current waveform can be made satisfactory, thus making it possible to suppress the occurrence of a secondary distortion component of each torque ripple.

Figure 11:
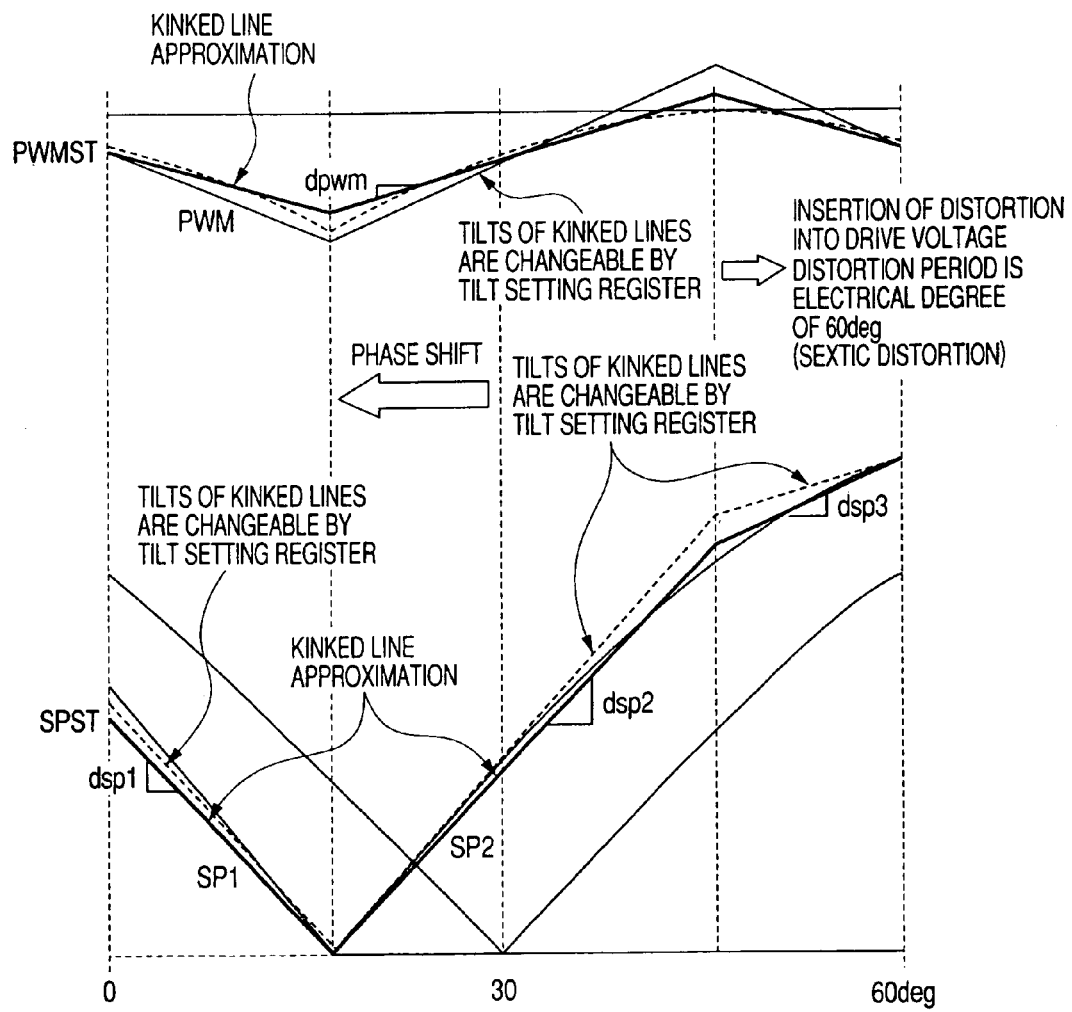
FIG. 11 is a diagram for describing an approximation method of voltages applied every electrical degree of 60°, according to the present invention.

A diagram for describing an approximation method of voltages applied every electrical degrees of 60 degrees is shown in FIG. 11. Repetitive patterns produced for every electrical angle of 60 degrees, which are shown in FIG. 10(d), are made approximate by kinked lines. It is necessary to suitably change the phase of each motor drive voltage according to the drive current. Since, however, the amount of its change varies according to a magnetic constant or the like of the motor, a setting register for the amount of a phase shift is provided. Further, a tilt setting register is provided such that the inclination of each kinked line at which the sine wave is made approximate, can be changed. Sextic distortion (where nth distortion: component of wave equivalent to n times the angular velocity of BEMF corresponding to a distortion component) can be inserted into each drive voltage when the inclination of each kinked line is changed as shown in FIG. 11 by the tilt setting register. Even in the case of a trapezoidal wave magnetizing motor or the like, the drive voltages can be adjusted in such a manner that a torque ripple becomes constant.

As an actual method of generating each drive voltage, initial values (PWMST and SPST) of drive voltage patterns are calculated from the amount of the phase shift determined by the drive current and the phase setting register. The drive voltages are generated by performing addition and subtraction of voltage amounts (dpwm, dsp1, dsp2 and dsp3) each changed at 1 PWM from the values of their corresponding voltage patterns every PWM as shown in FIG. 11. Incidentally, the method of inserting distortion into the drive voltage patterns is realized by changing the voltage amounts by the tilt setting register.

Figure 12A:
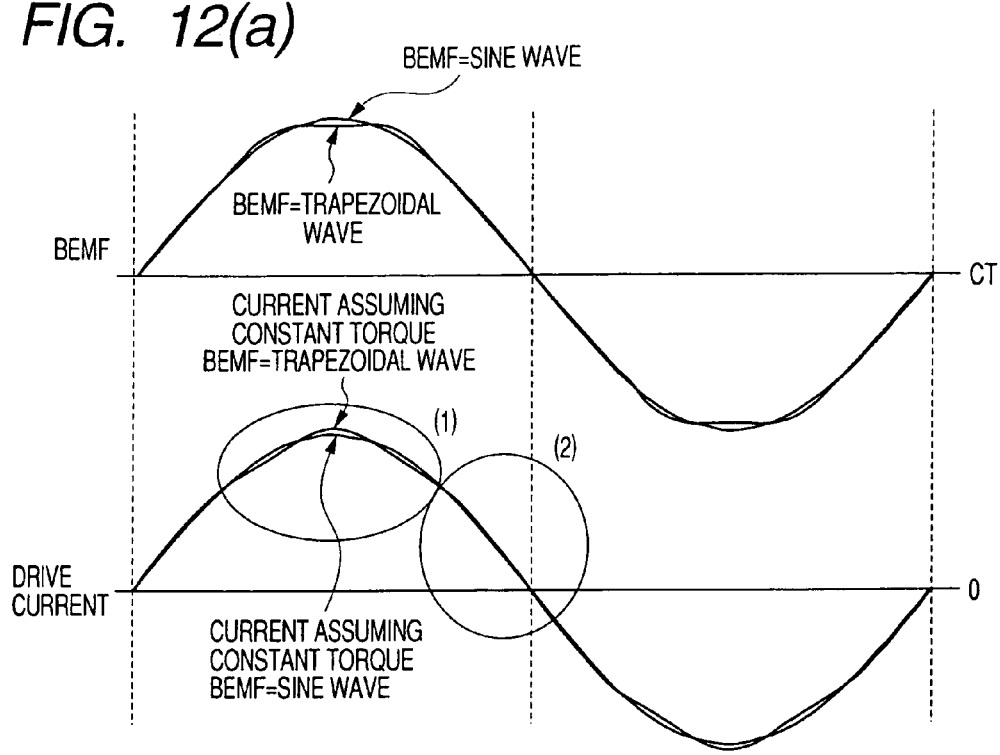
FIGS. 12(a) to 12(c) are diagrams for describing a method of setting the optimum drive current where BEMF employed in the motor drive device according to the present invention is a trapezoidal wave.
Figure 12B:
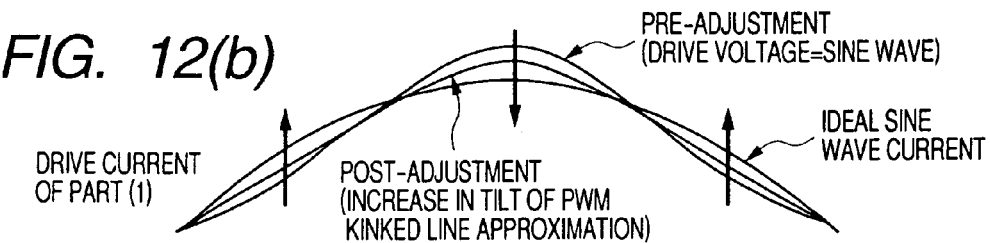
Figure 12C:
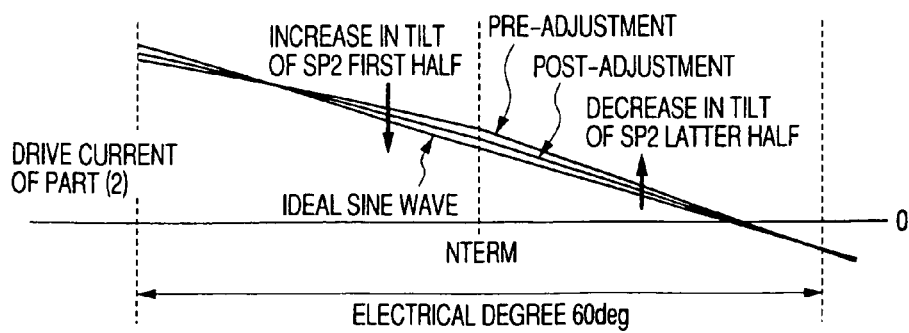

A diagram for describing a method of setting the optimum drive current where BEMF employed in the motor drive device according to the present invention is a trapezoidal wave, is shown in FIG. 12. FIG. 12(a) shows the difference between drive currents each of which assumes constant torque where BEMF is a sine wave and a trapezoidal wave. FIG. 12(b) shows an adjustment example of a current waveform of a section (1) where BEMF is a trapezoidal wave. And FIG. 12(c) shows an adjustment example of a current waveform of a section (2) where BEMF is a trapezoidal wave. When BEMF is of the sine wave, a drive current for assuming constant torque is represented as the sine wave. However, when BEMF is of the trapezoidal wave, there is a need to bring the top of the drive current to convexity by concavity of the top of BEMF as shown in FIG. 12(a) in order to bring the drive current to constant torque. Since distortion components of BEMF are principally of quintic and septinary components, BEMF is represented as indicated in the following (equation 3) using their distortion rates k5 and k7. A current obtained by inserting distortion into the top of the drive current is placed like the following (equation 4). Calculating torque with respect to three phases and determining the total torque yields the following (equation 5).

$$Vbemf\_u = \omega Kb \cdot \sin \omega t + \omega Kb \cdot k5 \cdot \sin 5\omega t + \omega Kb \cdot k7 \cdot \sin 7\omega t \quad \text{(Equation 3)}$$

$$Iu = Io \cdot \sin \omega t \times \{1 + ki6 \cdot \cos 6\omega t\} \quad \text{(Equation 4)}$$

$$T = Tu + Tv + Tw = 1.5 Kb \cdot Io \cdot \{1 + (-k5 + k7 - ki6) \cdot \cos 6\omega t\} \quad \text{(Equation 5)}$$

Thus, if a drive current that assumes ki6=−k5+k7 is obtained, then torque can be kept constant. Now, the relationship between drive current distortion and a tilt setting register is shown in FIGS. 12(b) and 12(c). When the tilt setting register is made high and dpwm is increased, the top of a drive voltage takes such a direction as to bring it to concavity. Although it depends even on the phase of the drive voltage, it is thus possible to raise or recess the top of the drive current waveform at the section (1) in FIG. 12(a). Changing dsp 2 and 3 by another tilt setting register makes it possible to adjust the drive current waveform at the section (2) in FIG. 12(a). Thus, it is possible to cause the drive current having the optimum distortion component expressed in the above (equation 5) to flow and thereby realize constant torque driving.

Figure 13:
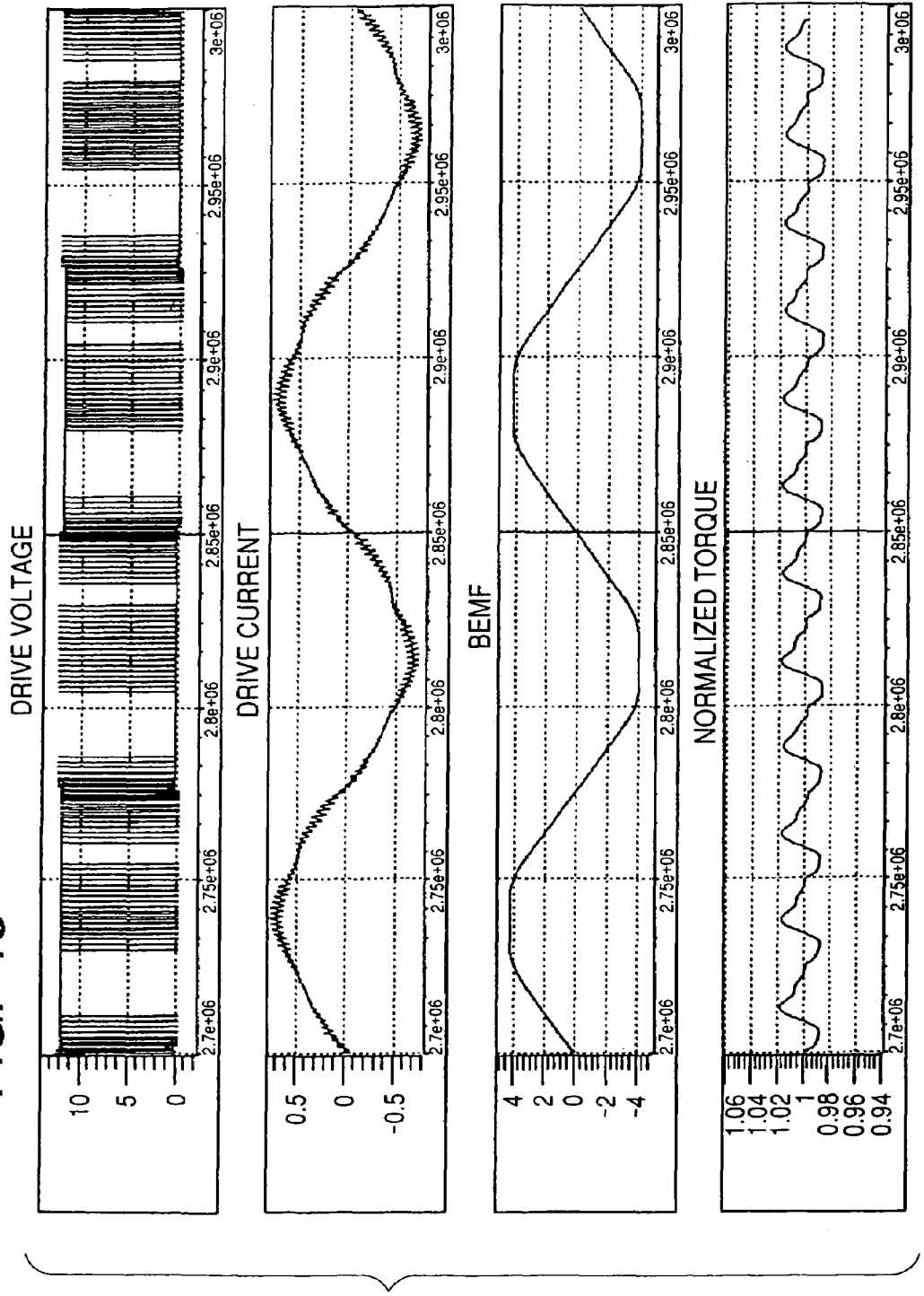
FIG. 13 is a waveform diagram showing simulation of a constant torque drive operation where BEMF employed in the motor drive device according to the present invention is a trapezoidal wave.
Figure 14:
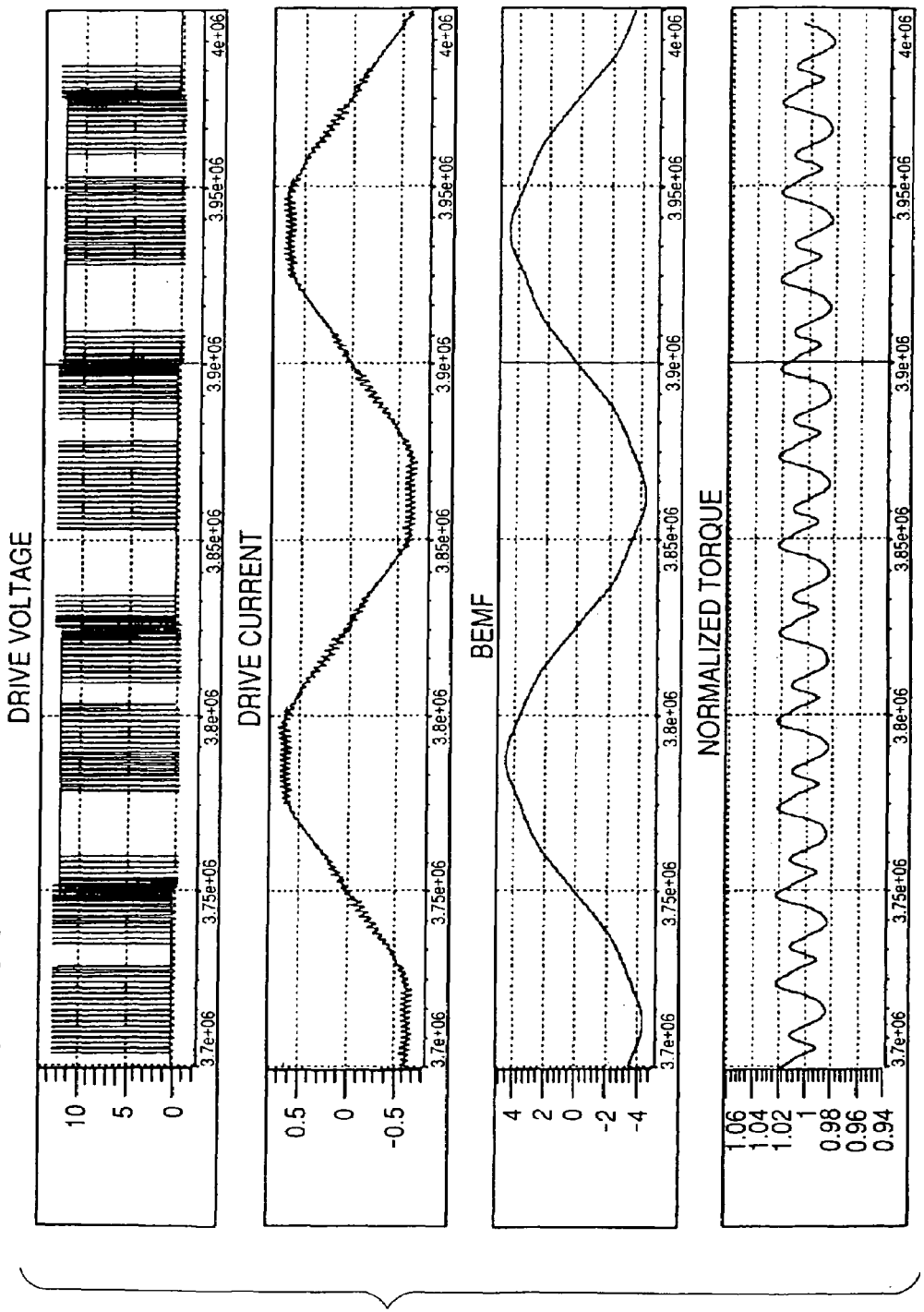
FIG. 14 is a waveform diagram illustrating simulation of a constant torque drive operation where BEMF employed in the motor drive device according to the present invention is a convex wave.

A waveform diagram showing simulation of a constant torque drive operation where BEMF is a trapezoidal wave, is shown in FIG. 13. A waveform diagram illustrating simulation of a constant torque drive operation where BEMF is a convex wave, is shown in FIG. 14. A drive voltage, a drive current, BEMF and normalized torque are shown in each of FIGS. 3 and 14 from above. Even in the case where BEMF is of the trapezoidal wave and the convex wave, the motor can be driven at constant torque by causing the drive current into which distortion is suitably inserted to flow.

Since an HDD system or the like is hard to monitor torque per se upon an actual operation, it is difficult to adjust the drive current to a drive current that minimizes a torque ripple while observing torque. Thus, as an adjustment example of drive current distortion, may be mentioned, a method of utilizing results from such simulation as shown in FIGS. 13 and 14 and obtaining optimum settings. Since the optimum drive current distortion is uniquely determined if the amount of distortion of BEMF is recognized as described above, the optimization may be performed by observing a drive current waveform and confirming distortion components through this frequency analysis.

Figure 15:
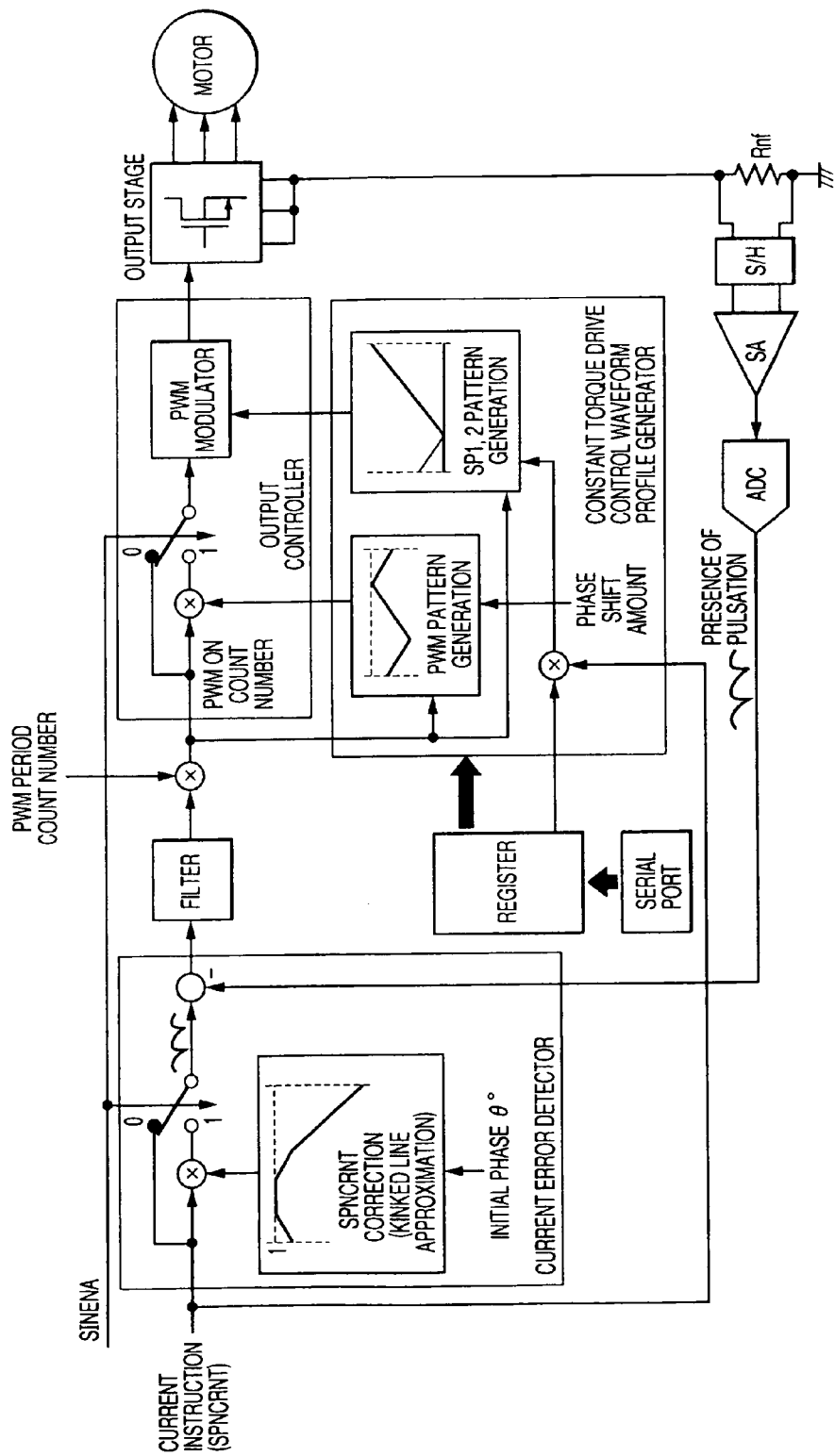
FIG. 15 is a current control system block diagram showing one embodiment of a constant torque drive system at 180-degree energization in the motor drive device according to the present invention.

A current control system block diagram showing one embodiment of a constant torque drive system at 180-degree energization in the motor drive device according to the present invention is shown in FIG. 15. In order to drive a three-phase DC motor at suitable torque, a current controller uses a motor drive current detected by a dc shunt resistor Rnf, and controls PWM duty such that it coincides with a current instruction to thereby output PWMCLK. The motor drive current detected by the dc shunt resistor Rnf is amplified by a sense amplifier SA, which in turn is converted into a digital value by an analog/digital converter ADC. A current error detector subtracts a detected value of the motor drive current from the current instruction (SPNCRNT) to determine a current error. Then, a loop filter determines PWM duty (Duty).

Thereafter, an output controller that performs PWM modulation drives individual phases at PWMCLK corresponding to the PWM duty. Now consider constant torque driving. Since the motor drive current is a sine wave-like drive current and voltage patterns therefor are switched at every electrical angle of 60 degrees, pulsation having a cycle of a 60-degree electrical angle is observed at the value detected by the dc shunt resistor. Thus, when the current instruction remains held at dc at the current error detector, a current detection error is periodically produced so that pulsation occurs in the PWM duty.

Therefore, if an attempt is made to bring a drive voltage into sine wave form to carry out constant torque driving, an accurate sine wave voltage cannot be obtained due to the influence of pulsation. Thus, when the constant torque driving is performed, the current error detector adds pre-expected pulsation based on current detection to the dc current instruction to avoid the occurrence of the current detection error. Thus, it is possible to accurately perform current control and obtain an accurate sine wave voltage even if the pulsation occurs upon current detection. Incidentally, correction coefficients given to the current instruction (SPNCRNT) can also be easily realized by kinked line approximation or the like.

Repetitive voltage patterns generated upon the constant torque driving are produced by a constant torque drive controller. The present controller is inputted with register-set phase setting parameters and tilt setting parameters of the voltage patterns through a serial port and generates voltage patterns corresponding to three phases. When switching driving is performed at a constant current to bring in torque as in a startup initial stage (when no constant torque driving is done) although three-phase PWM signals are generated by the voltage patterns, the present system is operated while remaining held at PWM duty obtained by current control, and the current error detection is also switched to control on the dc current.

Figure 16:
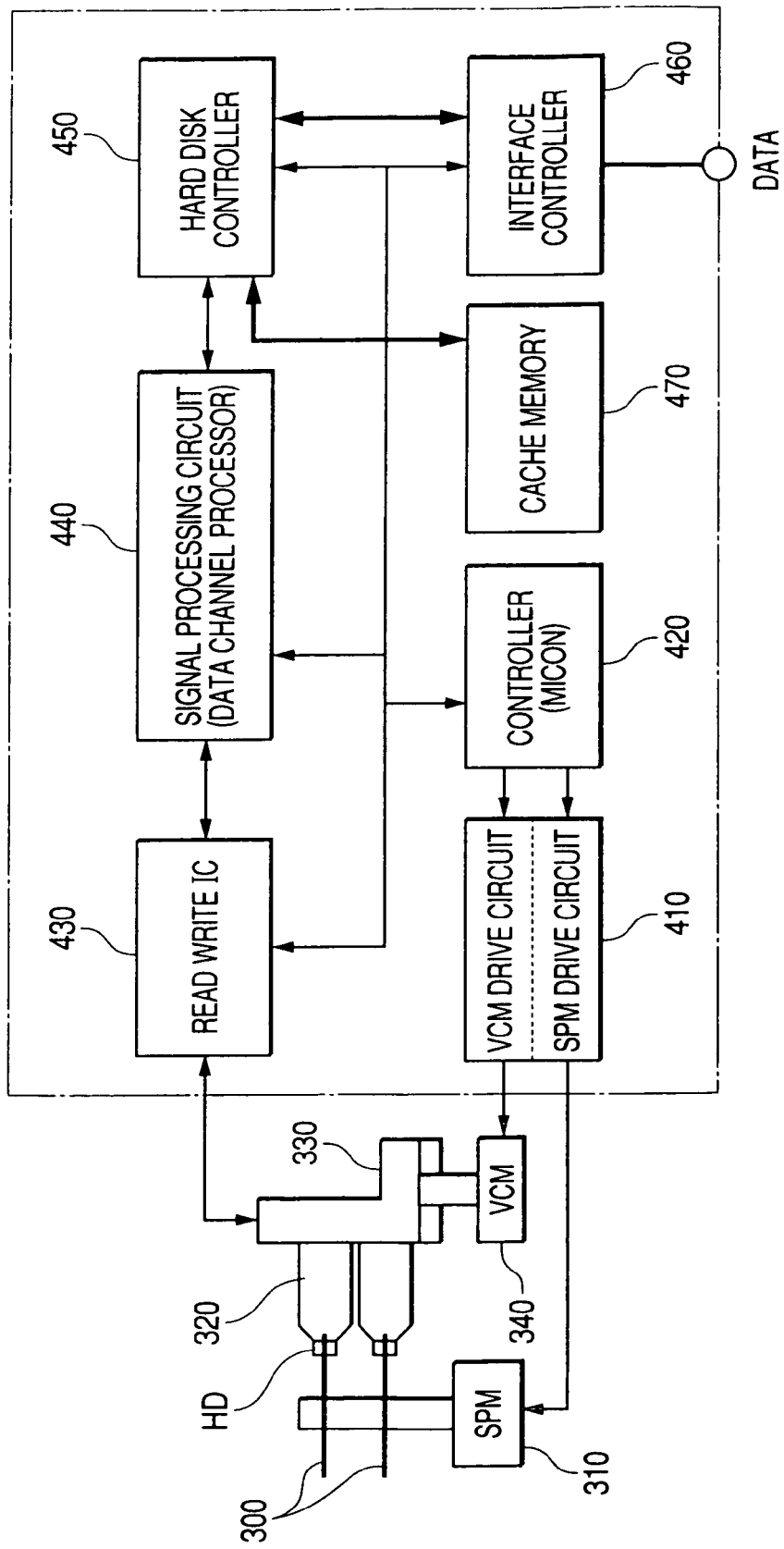
FIG. 16 is a block diagram illustrating one configurational example of the whole hard disk drive using a motor drive control circuit to which the present invention is applied.
Figure 17:
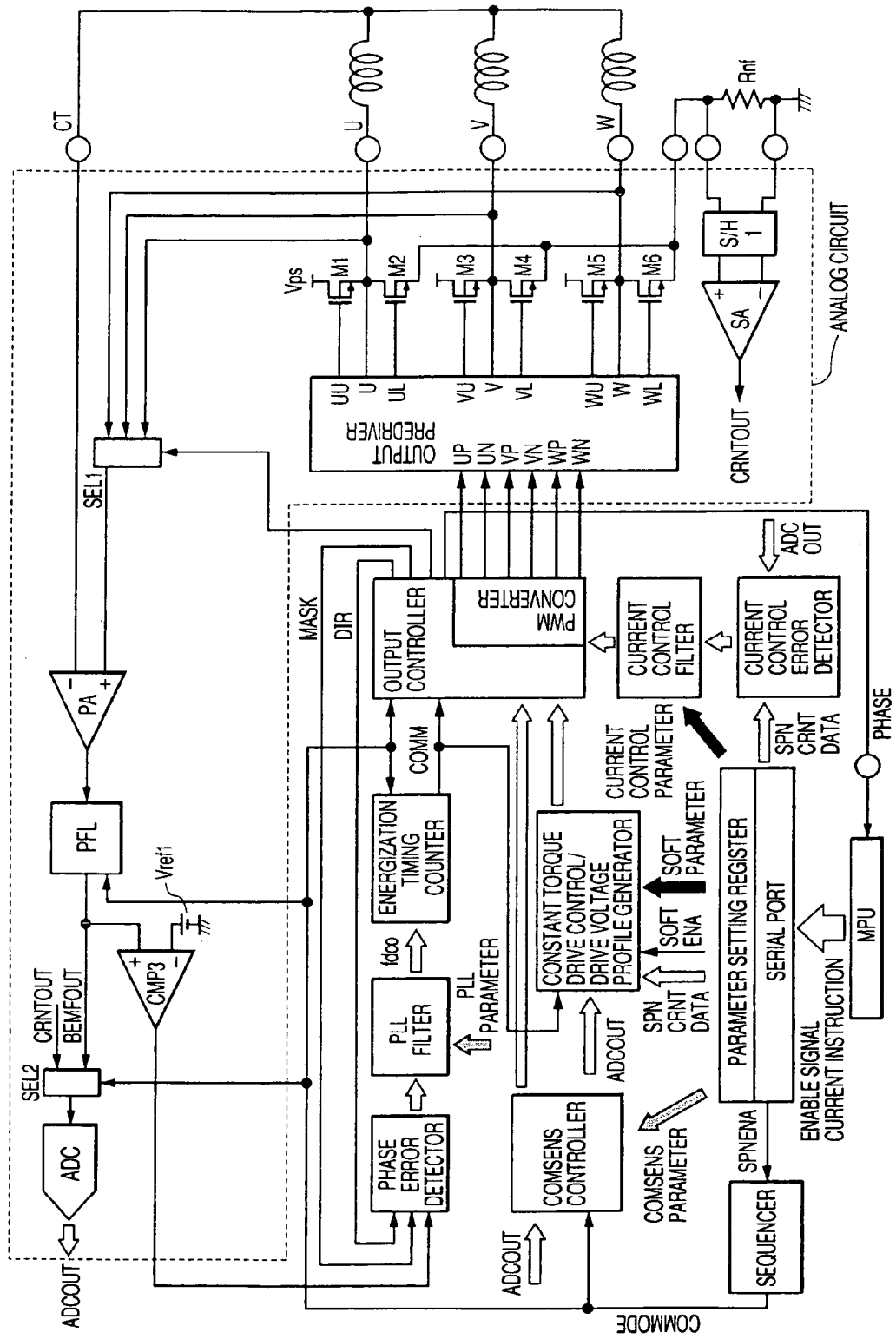
FIG. 17 is a block diagram showing a motor drive device discussed prior to the present invention.

A block diagram illustrating one configurational example of the whole hard disk drive taken as one example of a magnetic disk system having a voice coil motor system and a magnetic head drive system in addition to a spindle motor control system using a motor drive control circuit to which the present invention is applied, is shown in FIG. 16. In FIG. 16, reference numeral 310 indicates a spindle motor which rotates a magnetic disk 300, reference numerals 320 indicate arms each having a magnetic head (including a write magnetic head and a read magnetic head) HD at its leading end, and reference numeral 330 indicates a carriage which rotat- ably holds the arms 320. The voice coil motor 340 moves the carriage 330 to shift the corresponding magnetic head. A motor drive control circuit 410 performs servo control in such a manner that the center of the magnetic head coincides with the center of a track.

The motor drive control circuit 410 is a semiconductor integrated circuit in which a spindle motor drive control circuit having such a function as described in the embodiment and a voice coil motor drive control circuit which moves the magnetic heads in the direction of the diameter of the disk, are integrally formed. The motor drive control circuit 410 is operated in accordance with control signals supplied from a controller 420 and serve-controls the voice coil motor 340 and the spindle motor 310 so as to seek-move the corresponding magnetic head to a desired track and make constant the relative speed of the magnetic head. In this case, the power MOSFETs may be configured of external elements or may be ones incorporated in the semiconductor integrated circuit. Since ones large in drive current become difficult to be incorporated into the semiconductor integrated circuit, they may preferably be constituted of the external elements as described above.

Reference numeral 430 indicates a read write IC which amplifies a current corresponding to a change in magnetism detected by the corresponding magnetic head HD and transmits a read signal to a signal processing circuit (data channel processor) 440 and which amplifies a write pulse signal sent from the signal processing circuit 440 and outputs a drive current for the magnetic head HD.

Reference numeral 450 indicates a hard disk controller which fetches in read data transmitted from the signal processing circuit 440 to perform an error correcting process and which effects an error correction coding process on write data sent from a host and outputs the so-processed data to the signal processing circuit 440. The signal processing circuit 440 performs signal processing such as a modulation/demodulation process suitable for digital magnetic recording, signal processing such as waveform shaping taking into consideration magnetic recording characteristics and reads position information from the read signal of the magnetic head HD.

Reference numeral 460 indicates an interface controller which performs a transfer of data between the present system and an external device and its control or the like. The hard disk controller 450 is connected to a host computer such as a microcomputer of a main body of a personal computer through the interface controller 460. Reference numeral 470 indicates a cache memory for a buffer, which temporarily stores read data read from the magnetic disk at high speed. The system controller 420 comprising a microcomputer determines any of operation modes, based on a signal sent from the hard disk controller 450, controls respective parts of the present system in association with the operation modes and calculates a sector position or the like on the basis of address information supplied from the hard disk controller 450.

In the present embodiment, the presence or absence of a gate-to-source voltage Vgs of an output power MOSFET is determined during a transition period of an output voltage, in which a PWM operation is being performed, thereby to detect a zero cross of a current waveform, thus making it possible to realize 180-degree energization free of a motor's de-energization period by using the zero cross and significantly reduce torque ripples at motor driving. By utilizing the result of detection by the presence or absence of the gate-to-source voltage Vgs lying during the output transition period upon phase error detection under PLL control and utilizing an amount proportional to the difference in the number of times related to the result of polarity determination of a drive current, as a phase error, the PLL control can be performed so as not to be affected by a detection offset and a drive current ripple produced upon an actual operation.

Providing selectors to select a BEMF zero cross or a current zero cross as motor's position information makes it possible to stably start up a motor by a conventional BEMF detection-based drive system at a low rotation at which the rotation of the motor is instable. With the provision of a gain control function under PLL control, the motor can be operated with the same loop characteristic even if either BEMF or current is used as zero cross information. Thus, it is possible to suppress deterioration in rotational jitter or the like. Repetitive patterns set for every electrical angle of 60 degrees are taken with respect to each drive voltage, and the patterns are represented by linear approximation, whereby sine wave-like drive voltages high in accuracy can be obtained in a simple configuration, thus making it possible to realize motor driving at constant torque.

Owing to the repetitive patterns set at every electrical angle of 60 degrees, the vertical symmetry of a current waveform can be made satisfactory, and the occurrence of a secondary distortion component of each torque ripple can be suppressed. With the provision of a phase setting register and a tilt setting register, a drive voltage phase and drive voltage distortion can be adjusted without depending on the motor, thus making it possible to drive the motor at the optimal torque. Since a method of adjusting the drive voltage distortion that the tilt of each of the repetitive patterns set for every electrical angle of 60 degrees is changed, is easy to insert sextic distortion, it becomes a method effective in compensating for the influence of a distortion component (combination of principally quintic and septinary components) that exists in BEMF. By superimposing a pre-expected pulsating component on a current instruction upon drive current control, the current control can be performed without producing an error due to current detection, thus making it possible to realize a sine wave-shaped drive current.

Since 180-degree energization free of a de-energization period can be realized in the motor drive device to which the present invention is applied, torque ripples can be reduced, and the motor can be brought to low noise and low vibrations. It is also possible to reduce source current ripples of HDD with the 180-degree energization. Further, a larger number of HDD can be connected to the source or power supply. Owing to a phase error detecting method unaffected by a detection offset and drive current ripples, even motors relatively small in drive current, such as a motor small in the number of disks, a motor low in the number of revolutions, etc. are capable of realizing 180-degree energization.

While the invention made above by the present inventors has been described specifically on the basis of the above embodiments, the present invention is not limited to the above. Many changes can be made thereto within the scope not departing from the gist thereof. As the detection of a current zero cross, may be, for example, one for determining the gate-to-source voltages Vgs of the upper MOSFETs M1, M3 and M5 in addition to one for determining the presence or absence of the gate-to-source voltages Vgs of the lower power MOSFETs M2, M4 and M6. In this case, it may be determined according to whether the voltages among terminals UU-U, VU-V and WU-W of the output stage are larger than the threshold voltages Vth of the above MOSFETs. As described above, the power MOSFETs may be either ones incorporated in a motor drive integrated circuit or ones configured of external elements.

In a motor drive device including a three-phase DC motor output stage comprising power MOSFETs for supplying output voltages to three-phase coils, and a predriver for supplying drive voltages to the power MOSFETs, and in which lower hooks with a voltage minimum phase as GND and upper hooks with a voltage maximum phase as a source or power supply are set as patterns alternately repeated for every electrical angle of 60 degrees, and the patterns are expressed in linear approximation to generate sine wave-like drive voltages, thereby causing sine wave-like currents to flow into the three-phase coils, the position detection of the motor may be performed by one using a sensor like a hole element in addition to one using the above current zero cross. The present invention can be widely utilized as a motor drive device and an integrated circuit for motor driving. Incidentally, other elements such as bipolar transistors may be used as the power MOSFETs used as the power elements.

What is claimed is:

1. A motor drive device comprising:
a three-phase DC motor output stage comprising power elements which supply output voltages to three-phase coils, and a predriver which supplies drive voltages to the power elements,
wherein lower hooks with a voltage minimum phase as a first source for supplying the output voltages to the three-phase coils and upper hooks with a voltage maximum phase as a second source higher than the first source are set as patterns alternately repeated for every electrical angle of 60 degrees, and every three phase pattern is expressed in the combination of linear functions to generate sine wave-like drive voltages and the drive voltages are produced by the patterns, thereby causing sine wave-like currents to flow into the three-phase coils, and
a tilt setting register provided so as to be able to change the linear inclination of each drive voltage based on the combination of linear functions.

2. The motor drive device according to claim 1, wherein a component of higher degree of a phase current is capable of being inserted by changing the inclination of a drive voltage waveform expressed in the combination of linear functions.

3. The motor drive device according to claim 2, further comprising a phase setting register provided so as to be able to adjust the phase of each drive voltage according to a magnetic constant of the motor and the phase current.

4. The motor drive device comprising:
a current detector which samples and holds a voltage generated at a shunt resistor provided between a common connecting terminal of the lower power elements and a circuit ground potential and amplifies the voltage;
an analog-to-digital converter which converts a current included pulsating component detected by the current detector or a voltage that appears at a de-energized phase of three phases to a digital value; and
a current control error detector which detects the difference between a converted output of the analog-to-digital converter and the expected value of the pulsating component superimposed on a dc current instruction signal,
wherein pulse width modulation control of the output stage is performed by a signal outputted from the current control error detector.

5. The motor drive device according to claim 4, further comprising:
- a current zero cross detector which monitors whether a gate-to-source voltage of each of the power elements is greater than or equal to a predetermined voltage, and performs zero cross detection of a current;
- a profile generator which uses energization switching timing in phase locked loop control which performs control by an output of the current zero cross detector to thereby generate drive voltages of 180° energization; and
- an output controller which forms pulse width modulation signals to be transferred to the output stage in response to the drive voltages formed by the profile generator.

* * * * *